US011998070B2

(12) United States Patent
Swope et al.

(10) Patent No.: US 11,998,070 B2
(45) Date of Patent: Jun. 4, 2024

(54) TOWEL AND MITT COMBINATION

(71) Applicant: Temp-Tations Brands LLC, Exton, PA (US)

(72) Inventors: Charles Swope, Downingtown, PA (US); Tara Tesher, Downingtown, PA (US)

(73) Assignee: Temp-Tations Brands LLC, Exton, PA (US)

( * ) Notice: Subject to any disclaimer, the term of this patent is extended or adjusted under 35 U.S.C. 154(b) by 1160 days.

(21) Appl. No.: 16/671,895

(22) Filed: Nov. 1, 2019

(65) Prior Publication Data

US 2021/0127768 A1   May 6, 2021

(51) Int. Cl.
| A47L 19/00 | (2006.01) |
| A41D 19/01 | (2006.01) |
| A47G 25/00 | (2006.01) |
| A47J 45/10 | (2006.01) |
| A47K 10/12 | (2006.01) |
| A47K 7/02 | (2006.01) |

(52) U.S. Cl.
CPC ............. *A41D 19/01* (2013.01); *A47G 25/00* (2013.01); *A47J 45/10* (2013.01); *A47K 10/12* (2013.01); *A47L 19/00* (2013.01); *A47K 7/02* (2013.01)

(58) Field of Classification Search
CPC .......... A47K 10/12; A47K 7/02; A47L 19/00; A47L 13/18
See application file for complete search history.

(56) References Cited

U.S. PATENT DOCUMENTS

| 5,509,164 | A | * | 4/1996 | Weill ..................... A47K 7/022 15/222 |
| 9,462,918 | B2 | * | 10/2016 | Simoni ................ A01K 13/001 |
| 9,706,898 | B1 | * | 7/2017 | Kraft ....................... A47L 19/00 |
| 9,848,751 | B2 | | 12/2017 | McKenzie |
| 2017/0202405 | A1 | * | 7/2017 | Moravsky ............. A47K 7/022 |

\* cited by examiner

*Primary Examiner* — Michael D Jennings
(74) *Attorney, Agent, or Firm* — Blank Rome LLP

(57) ABSTRACT

A towel and mitt combination having a towel and a mitt is disclosed. In one configuration, the towel and mitt combination includes a towel that includes a front fastener. The towel and mitt combination also includes a mitt that includes a mitt fastener. The mitt fastener is configured to be releasably secured to the front fastener. The mitt is configured to be operatively and removably connected to the towel via the mitt fastener and the front fastener, when the mitt fastener is releasably secured to the front fastener. In another configuration, the towel includes a tab which includes the front fastener. These and other embodiments foster a coherent towel and mitt combination that enables a user to fasten a mitt to a towel with great convenience and ease.

17 Claims, 8 Drawing Sheets

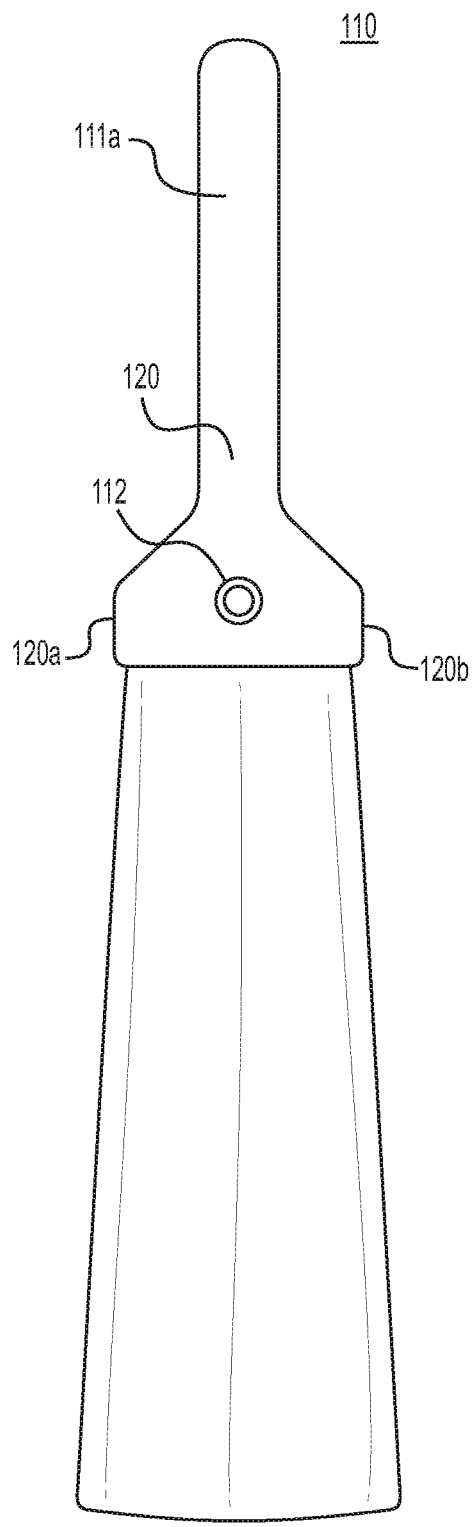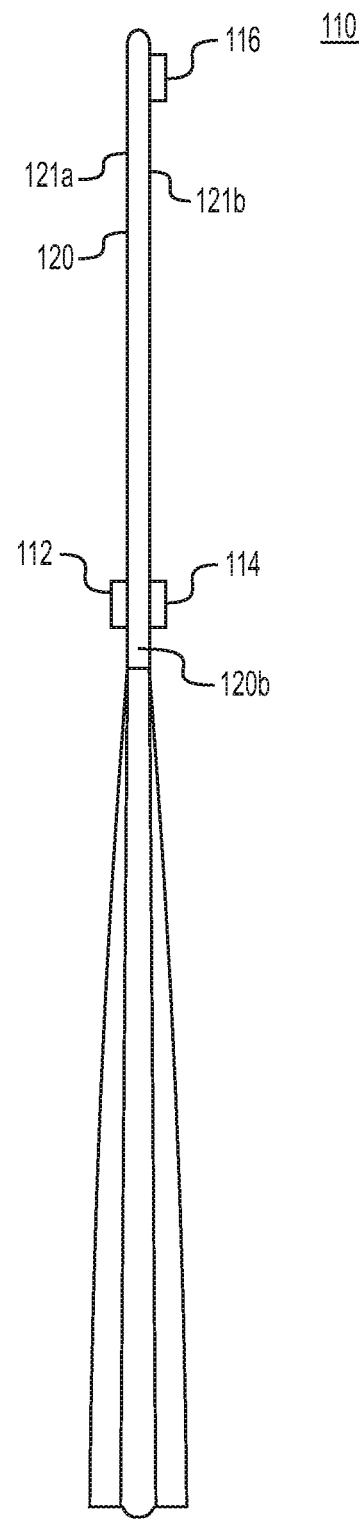
FIG. 1A
FIG. 1B

TOWEL AND MITT COMBINATION

FIELD OF THE INVENTION

Embodiments are in the field of towels and mitts. More particularly, embodiments disclosed herein relate to towel and mitt combinations having a towel and a mitt which, inter alia, foster a coherent towel and mitt combination that enables a user to fasten a mitt to a towel with great convenience and ease.

BACKGROUND OF THE INVENTION

There are several challenges that are associated with storage, handling, and/or use of traditional towels and mitts. Some of these challenges arise from fundamental problems with the traditional towels and mitts, such as:

A mitt is often misplaced even when a towel is within reach or a towel's location is known.

A towel is often misplaced even when a mitt is within reach or a mitt's location is known.

A dedicated and additional storage area is required for a separated towel and mitt.

A separate towel and mitt requires time for a user to individually locate each item prior to use.

A separate towel and mitt requires time for a user to individually store each item after use.

Thus, it is desirable to provide a towel and mitt combination that is able to overcome the above disadvantages.

Advantages of the present invention will become more fully apparent from the detailed description of the invention hereinbelow.

SUMMARY OF THE INVENTION

Embodiments are directed to a towel and mitt combination. The towel and mitt combination comprises a towel comprising a front fastener. The towel and mitt combination also comprises a mitt comprising a mitt fastener. The mitt fastener is configured to be releasably secured to the front fastener. The mitt is configured to be operatively and removably connected to the towel via the mitt fastener and the front fastener, when the mitt fastener is releasably secured to the front fastener. The front fastener is spaced from an edge of the towel, or the mitt fastener is spaced from left and right edges of the mitt.

Embodiments are also directed to another towel and mitt combination which comprises a towel comprising a tab. The tab comprises a front fastener. The towel and mitt combination also comprises a mitt comprising a mitt fastener. The mitt fastener is configured to be releasably secured to the front fastener. The mitt is configured to be operatively and removably connected to the tab via the mitt fastener and the front fastener, when the mitt fastener is releasably secured to the front fastener.

Embodiments are further directed to a further towel and mitt combination which comprises a towel comprising a tab. The tab comprises a proximal fastener. The towel and mitt combination also comprises a mitt comprising a mitt fastener. The mitt fastener is configured to be releasably secured to the proximal fastener. The mitt is configured to be operatively and removably connected to the tab via the mitt fastener and the proximal fastener, when the mitt fastener is releasably secured to the proximal fastener.

Embodiments are yet further directed to a yet further towel and mitt combination which comprises a towel comprising a tab. The tab comprises a hole, a distal fastener, a proximal end, a distal end, a front side, and a rear side that is opposite to the front side. The hole extends from the front side to the rear side and is positioned towards the proximal end, and the distal fastener is positioned towards the distal end. The towel and mitt combination also comprises a mitt comprising a mitt fastener. The distal fastener is configured to be releasably secured to the mitt fastener through the hole. The mitt is configured to be operatively and removably connected to the tab via the mitt fastener and the distal fastener, and the tab is configured to be formed into a loop, when the distal fastener is releasably secured to the mitt fastener through the hole. The loop is configured to be removably connected to an object.

Additional embodiments and additional features of embodiments for the towel and mitt combination are described below and are hereby incorporated into this section.

BRIEF DESCRIPTION OF THE DRAWINGS

The detailed description will refer to the following drawings, wherein like reference numerals refer to like elements, and wherein:

FIG. 1A is a diagram illustrating a side view of a front side of a towel, in accordance with an embodiment of the present invention. The towel comprises a tab which comprises a front fastener;

FIG. 1B is a diagram illustrating a side view of an edge of the towel shown in FIG. 1A;

DETAILED DESCRIPTION OF THE INVENTION

Figure 2C:
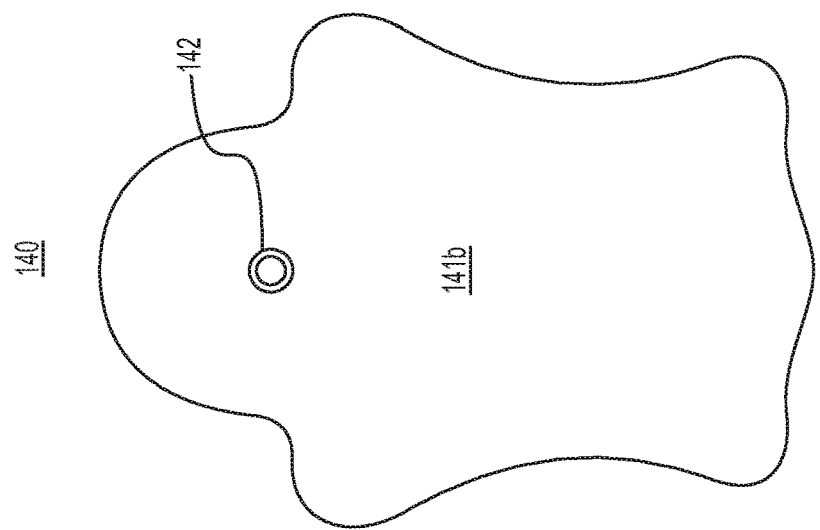
FIG. 2C is a diagram illustrating a side view of a rear side of the mitt shown in FIG. 2A.

It is to be understood that the figures and descriptions of the present invention may have been simplified to illustrate elements that are relevant for a clear understanding of the present invention, while eliminating, for purposes of clarity, other elements found in a typical towel or mitt. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

For purposes of this disclosure, the term "towel" refers to an element or combination of elements that may be in the form of one or more items selected from the group consisting of a towel (e.g., oven towel, dish towel, kitchen towel, etc.), rag, cloth (e.g., dish cloth), sheet, wipe, paper (e.g., absorbent paper), and combinations thereof.

For purposes of this disclosure, the term "mitt" refers to an element or combination of elements that may be in the form of one or more items selected from the group consisting of a mitt (e.g., oven mitt), mitten, glove, holder (e.g., potholder), handwarmer, and combinations thereof.

For purposes of this disclosure, the term "tab" refers to an element or combination of elements that may be in the form of one or more items selected from the group consisting of a tab, belt, wire, string, strap, handle, tie, cable, cord, rope, ribbon, and combinations thereof.

For purposes of this disclosure, the term "fastener" refers to an element or combination of elements that may be in the form of one or more items selected from the group consisting of a fastener, snap, button, clasp, clip, carabiner, buckle, D-ring, magnetic fastener, hook, hook and loop fastener, a complementary element (e.g., slit or hole for insertion of a button or hook) that works in conjunction with any of the above fasteners, and combinations thereof.

FIG. 1A, by way of example only, is a diagram illustrating a side view of a front side of a towel 110, in accordance with an embodiment of the present invention. The towel 110 comprises a tab 120 which comprises a front fastener 112.

FIG. 1B is a diagram illustrating a side view of an edge of the towel 110 (see tab edge 120b) shown in FIG. 1A.

Figure 2B:
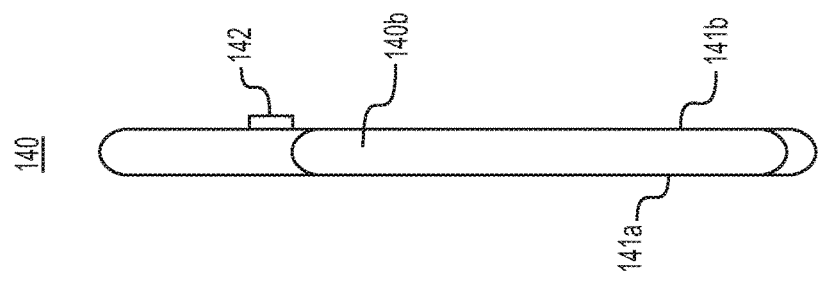
FIG. 2B is a diagram illustrating a side view of an edge of the mitt shown in FIG. 2A.
Figure 2A:
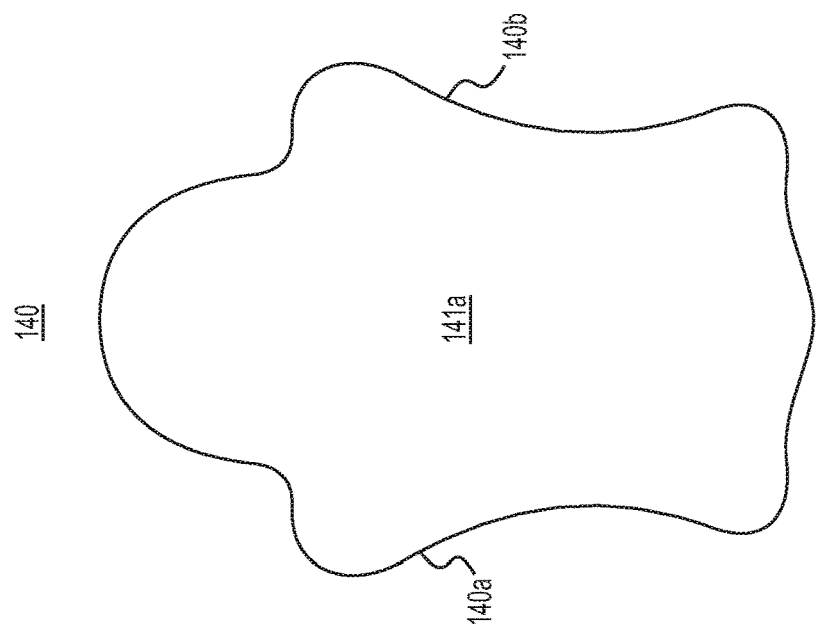
FIG. 2A is a diagram illustrating a side view of a front side of a mitt, in accordance with an embodiment of the present invention.

FIG. 2A, by way of example only, is a diagram illustrating a side view of a front side 141a of a mitt 140, in accordance with an embodiment of the present invention.

FIG. 2B is a diagram illustrating a side view of an edge 140b of the mitt 140 shown in FIG. 2A.

FIG. 2C is a diagram illustrating a side view of a rear side 141b of the mitt 140 shown in FIG. 2A.

Figure 3:
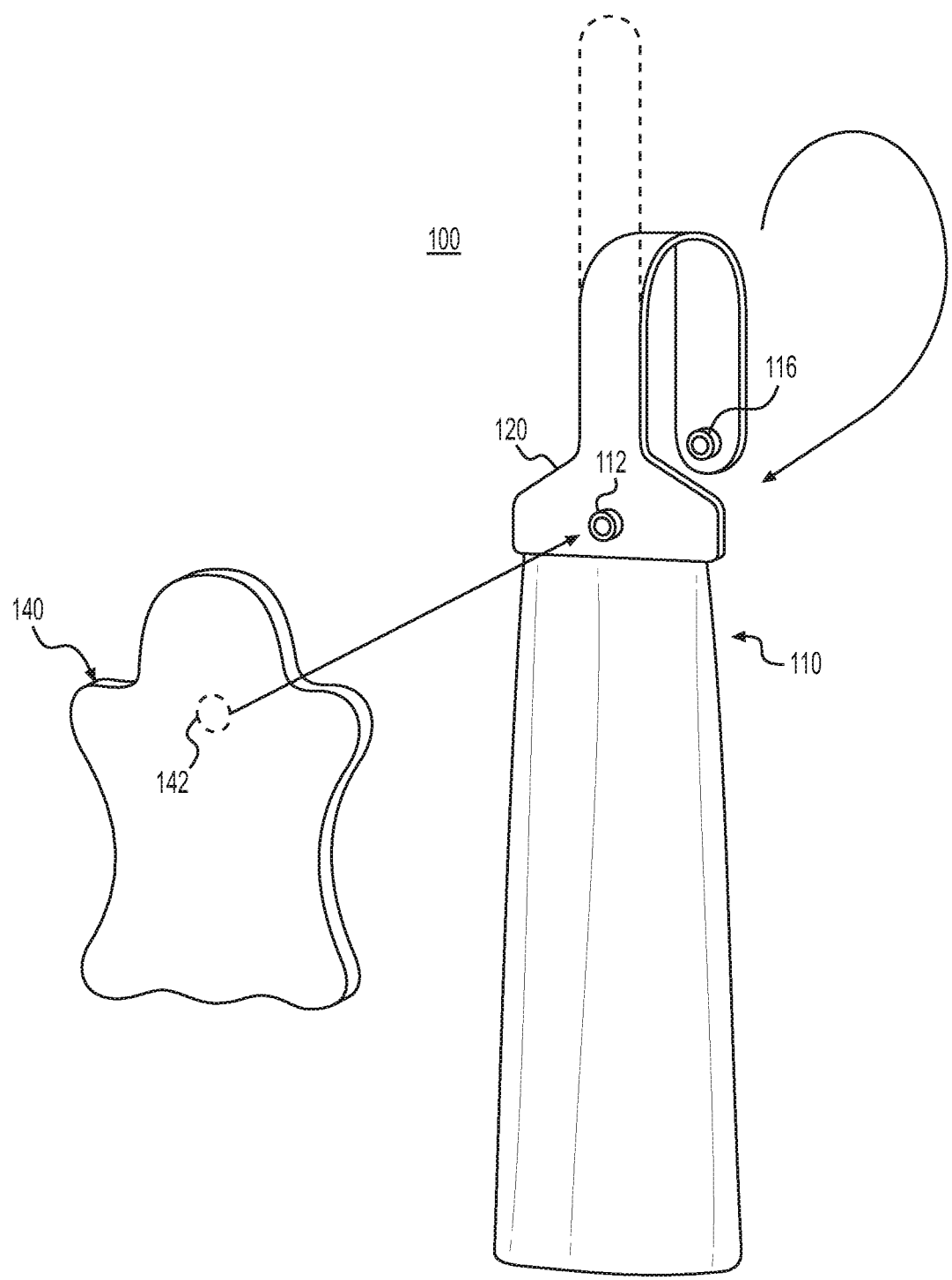
FIG. 3 is a diagram illustrating an exploded perspective view of the towel and mitt shown in FIGS. 1A and 2A, respectively, while depicting movement of the mitt towards the towel for their connection via the mitt fastener and front fastener.

FIG. 3, by way of example only, is a diagram illustrating an exploded perspective view of the towel 110 and mitt 140 shown in FIGS. 1A and 2A, respectively, while depicting movement of the mitt 140 towards the towel 110 for their connection via the mitt fastener 142 and front fastener 112, and depicting movement of the distal fastener 116 towards the proximal fastener 114 thereby forming a loop.

Figure 4:
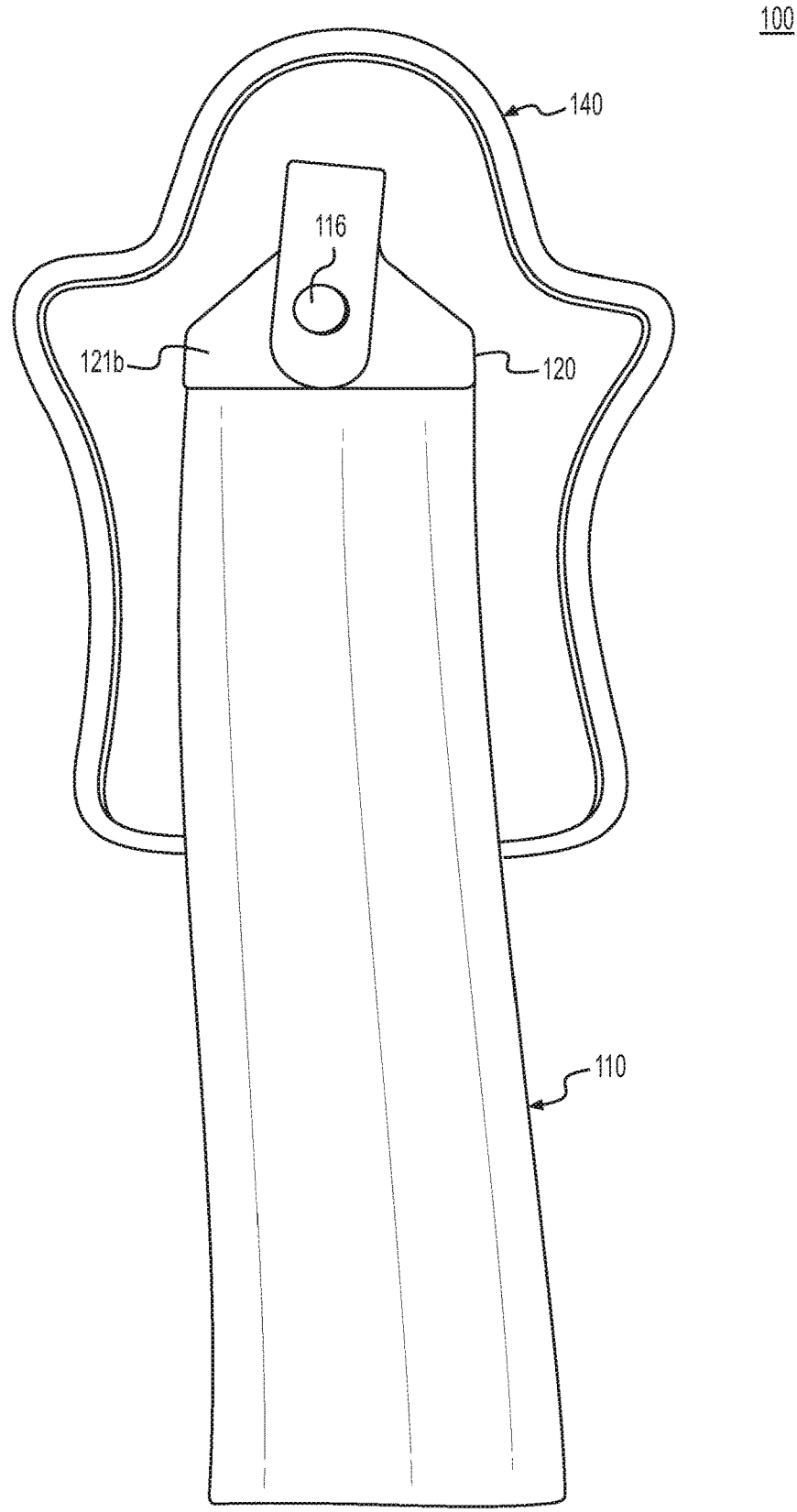
FIG. 4 is a diagram illustrating a side view of the mitt and rear side of the towel shown in FIG. 3, while the mitt is removably connected to the towel.

FIG. 4 is a diagram illustrating a side view of the mitt 140 and rear side of the towel 110 (see tab rear side 121b) shown in FIG. 3, while the mitt 140 is removably connected to the towel 110.

Figure 6:
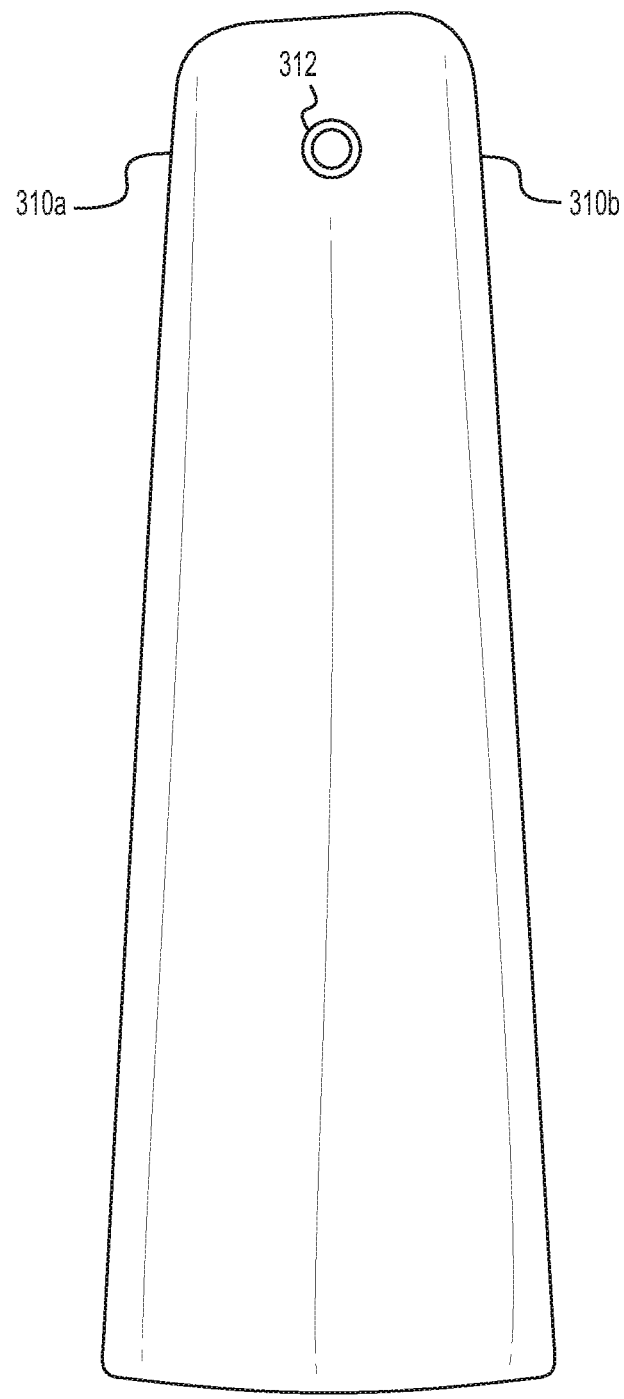
FIG. 6 is a diagram illustrating a side view of a front side of a towel, in accordance with an embodiment of the present invention. The towel comprises a front fastener. The front fastener is not part of a tab.

FIG. 6, by way of example only, is a diagram illustrating a side view of a front side of a towel 310, in accordance with an embodiment of the present invention. The towel 310 comprises a front fastener 312. The front fastener 312 is not part of a tab and may be integral with the material of the towel or may be fixed directly to the material of the towel via sewing or other fixation mechanism.

With reference to FIGS. 1A-4 and 6, embodiments are directed to a towel and mitt combination 100. The towel and mitt combination 100 comprises a towel 110, 310 comprising a front fastener 112, 312. The towel and mitt combination 100 also comprises a mitt 140 comprising a mitt fastener 142. The mitt fastener 142 is configured to be releasably secured to the front fastener 112, 312. The mitt 140 is configured to be operatively and removably connected to the towel 110, 310 via the mitt fastener 142 and the front fastener 112, 312, when the mitt fastener 142 is releasably secured to the front fastener 112, 312. The front fastener 112, 312 is spaced from a tab edge 120a, 120b (or towel edge 310a, 310b), or the mitt fastener 142 is spaced from left and right edges 140a, 140b of the mitt 140.

In an embodiment, the front fastener 112, 312 is spaced at a distance greater than 1.625" from the tab edge 120a, 120b or towel edge 310a, 310b. This spacing allows for a balanced weight distribution of the mitt 140 and puts less stress on the tab edges 120a, 120b or the towel edges 310a, 310b, when the mitt 140 is removably connected to the towel 110, 310 via the mitt fastener 142 and the front fastener 112, 312. This configuration may also facilitate locating the mitt 140 when connected to the towel 110, 310 as the mitt 140 would be positioned in a more centralized location on the towel 110, 310.

In an embodiment, the mitt fastener 142 is spaced at a distance greater than 1.25" from the left and right edges 140a, 140b of the mitt 140. This spacing allows for a balanced weight distribution of the mitt 140 and puts less stress on mitt edges 140a, 140b and/or seams of the mitt 140, when the mitt 140 is removably connected to the towel 110, 310 via the mitt fastener 142 and the front fastener 112, 312. This configuration may also facilitate grasping the mitt 140 from any mitt edge 140a, 140b when the mitt 140 is connected to the towel 110, 310 since the mitt edges 140a, 140b would be spaced from the connection/fastening point and, therefore, not rigidly situated adjacent to the towel surface.

In other embodiments in this disclosure, the front fastener 112, 312 may not be spaced from a tab edge 120a, 120b (or towel edge 310a, 310b), and/or the mitt fastener 142 may not be spaced from left and right edges 140a, 140b of the mitt 140.

With reference to FIGS. 1A-4, in an embodiment, the towel 110 further comprises a tab 120, wherein the tab 120 comprises the front fastener 112. The tab 120 may be configured to be removably connected to an object. The object may be selected from the group consisting of an appliance (e.g., oven, microwave, etc.), drawer, chair, cabinet, and combinations thereof.

In an embodiment, the tab 120 may further comprise a proximal fastener 114 and a distal fastener 116 and may be configured to be formed into a loop when the distal fastener 116 is releasably secured to the proximal fastener 114. The loop may be configured to be removably connected to an object. For example, the loop may be formed around an oven handle to hang therefrom. In an embodiment, the proximal and distal fasteners 114, 116 are positioned on a rear side 121b of the tab 120, and the front fastener 112 is positioned on a front side 121a of the tab 120 that is opposite to the rear side 121b of the tab 120.

In an embodiment, at least one of the front fastener 112 (or front fastener 312 in FIG. 6) and mitt fastener 142 may be selected from the group consisting of a snap, button, clasp, clip, carabiner, buckle, D-ring, magnetic fastener, hook, hook and loop fastener, and combinations thereof.

With reference to FIGS. 1A-4, embodiments are also directed to another towel and mitt combination 100 which comprises a towel 110 comprising a tab 120. The tab 120 comprises a front fastener 112. The towel and mitt combination 100 also comprises a mitt 140 comprising a mitt fastener 142. The mitt fastener 142 is configured to be releasably secured to the front fastener 112. The mitt 140 is configured to be operatively and removably connected to the tab 120 via the mitt fastener 142 and the front fastener 112, when the mitt fastener 142 is releasably secured to the front fastener 112.

In an embodiment, the tab 120 may be configured to be removably connected to an object. The object may be selected from the group consisting of an appliance, drawer, chair, cabinet, and combinations thereof.

In an embodiment, the tab 120 may further comprise a proximal fastener 114 and a distal fastener 116 and may be configured to be formed into a loop when the distal fastener 116 is releasably secured to the proximal fastener 114. The loop may be configured to be removably connected to an object. In an embodiment, the proximal and distal fasteners 114, 116 are positioned on a rear side 121b of the tab 120, and the front fastener 112 is positioned on a front side 121a of the tab 120 that is opposite to the rear side 121b of the tab 120.

Figure 5:
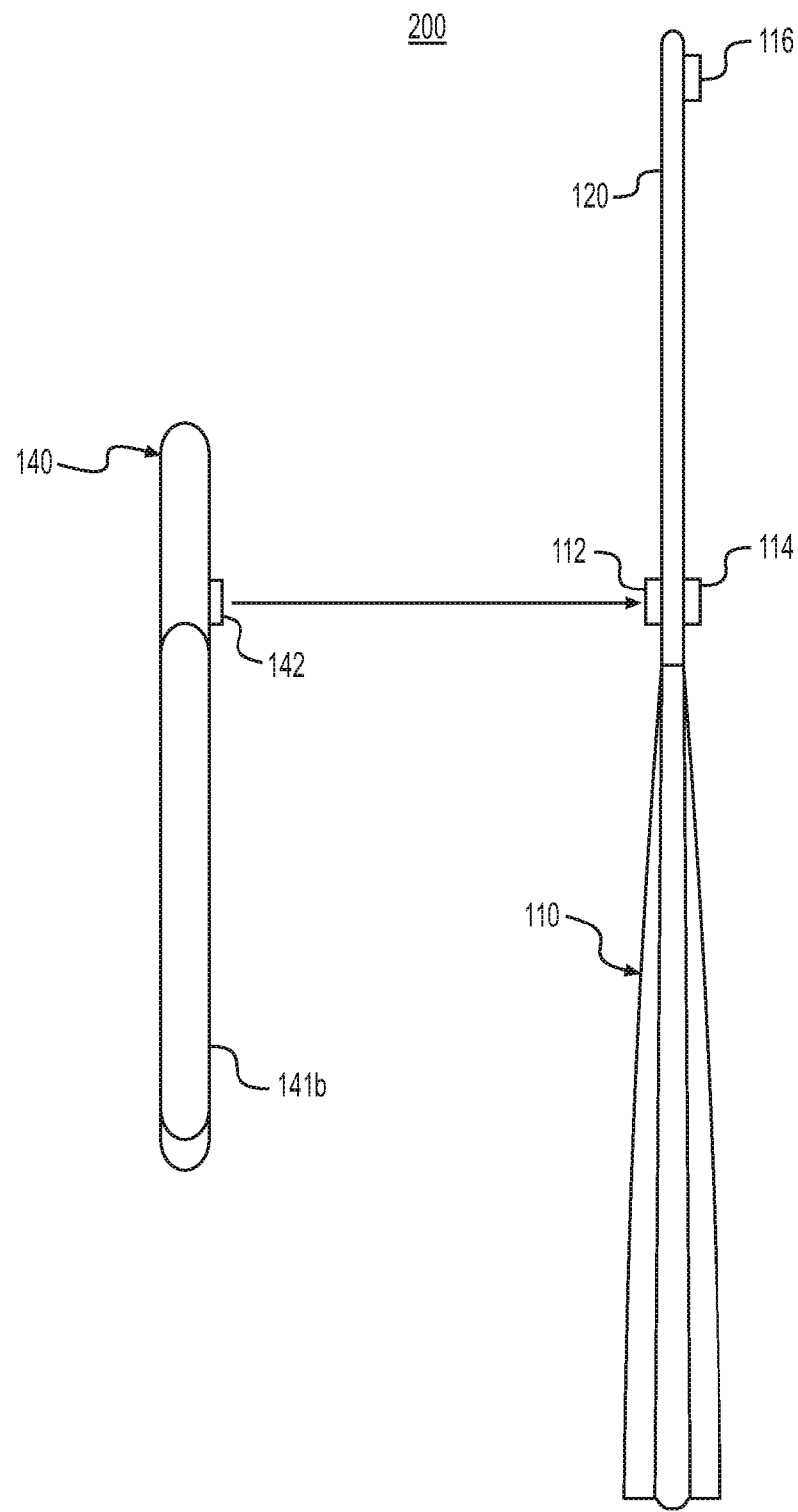
FIG. 5 is a diagram illustrating an exploded perspective view of the towel and mitt shown in FIGS. 1A and 2A, respectively, while depicting movement of the mitt towards the towel for their removable connection via the mitt fastener and proximal fastener.

FIG. 5, by way of example only, is a diagram illustrating an exploded perspective view of the towel 110 and mitt 140 shown in FIGS. 1A and 2A, respectively, while depicting movement of the mitt 140 towards the towel 110 for their removable connection via the mitt fastener 142 and proximal fastener 114.

With reference to FIG. 5, embodiments are further directed to a further towel and mitt combination 200 which comprises a towel 110 comprising a tab 120. The tab 120 comprises a proximal fastener 114. The towel and mitt combination 200 also comprises a mitt 140 comprising a mitt fastener 142. The mitt fastener 142 is configured to be releasably secured to the proximal fastener 114. The mitt 140 is configured to be operatively and removably connected to the tab 120 via the mitt fastener 142 and the proximal fastener 114, when the mitt fastener 142 is releasably secured to the proximal fastener 114.

In an embodiment, the tab 120 may be configured to be removably connected to an object when the mitt 140 is not connected to the tab 120 via the proximal fastener 114.

In an embodiment, the tab 120 may further comprise a distal fastener 116 and may be configured to be formed into a loop when the distal fastener 116 is releasably secured to the proximal fastener 114 and when the mitt fastener 142 is not secured to the proximal fastener 114, and wherein the loop may be configured to be removably connected to an object when the mitt 140 is not connected to the tab 120 via the proximal fastener 114. In an embodiment, the proximal and distal fasteners 114, 116 are positioned on a rear side 121b of the tab 120. The tab 120 may or may not comprise a front fastener 112 as shown in FIG. 5. If the front fastener 112 is provided, the mitt fastener 142 may be configured to be releasably secured to either the front fastener 112 or the proximal fastener 114.

Figure 7C:
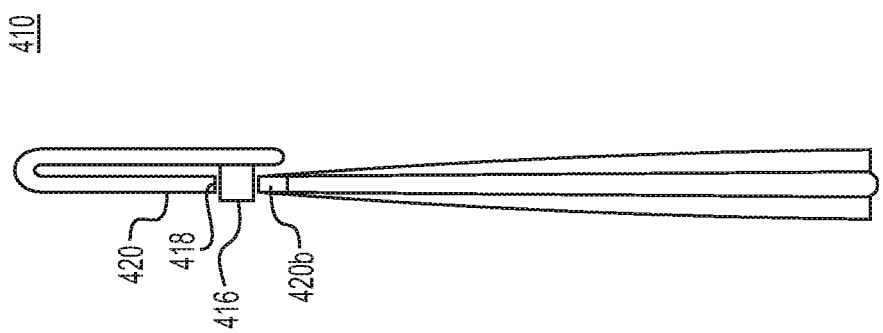
FIG. 7C is a diagram illustrating a cross-sectional side view of the towel shown in FIG. 7A with the tab formed in a loop and having an elongated distal fastener extending through the hole and configured to be fastened to a mitt fastener.
Figure 7B:
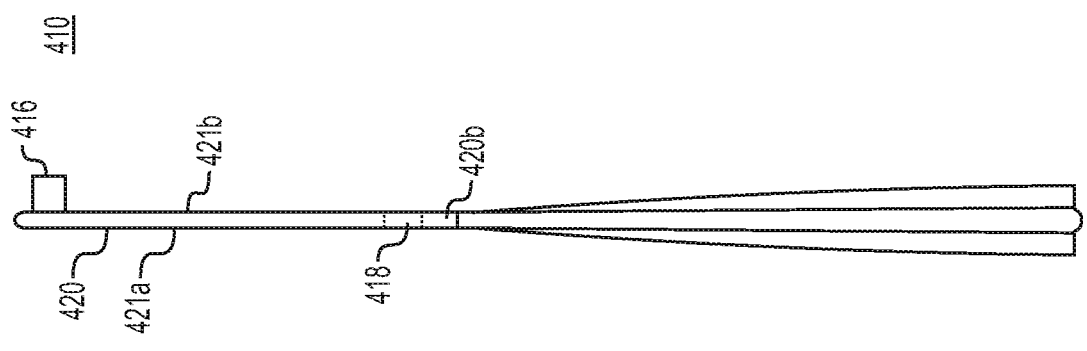
FIG. 7B is a diagram illustrating a side view of an edge of the towel shown in FIG. 7A.
Figure 7A:
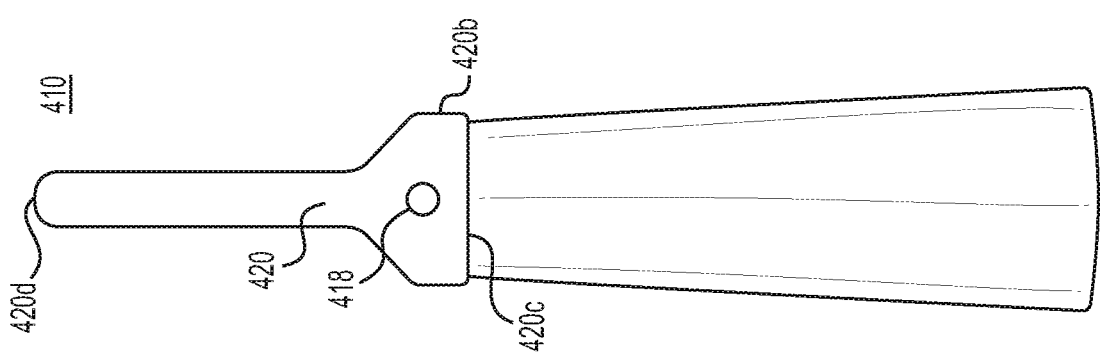
FIG. 7A is a diagram illustrating a side view of a front side of a towel, in accordance with an embodiment of the present invention. The towel comprises a tab which comprises a hole.

FIG. 7A, by way of example only, is a diagram illustrating a side view of a front side of a towel 410, in accordance with an embodiment of the present invention. The towel 410 comprises a tab 420 which comprises a hole 418.

Figure 8:
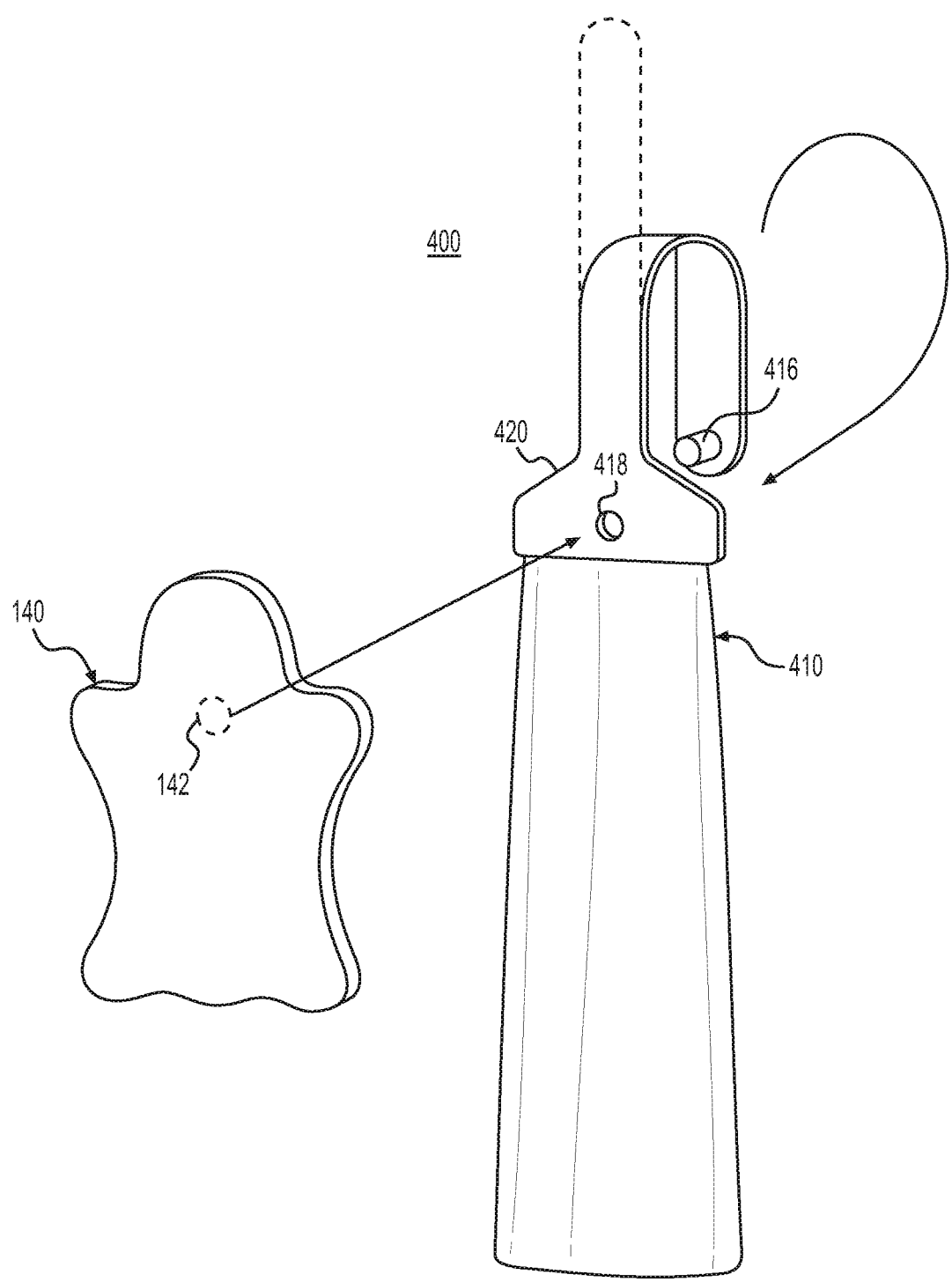
FIG. 8 is a diagram illustrating an exploded perspective view of the towel and mitt shown in FIGS. 7A and 2A, respectively, while depicting movement of the mitt towards the towel for their removable connection via the mitt fastener and distal fastener through the hole.

FIG. 7B is a diagram illustrating a side view of an edge of the towel 410 (see tab edge 420b) shown in FIG. 7A;

FIG. 7C, by way of example only, is a diagram illustrating a cross-sectional side view of the towel 410 shown in FIG. 7A with the tab 420 formed in a loop and having an elongated distal fastener 416 extending through the hole 418 and configured to be fastened to a mitt fastener 142 (see FIG. 8). Alternatively, the mitt fastener 142 may be elongated instead of the distal fastener 416, in order to extend through hole 418. As another alternative, a portion of the tab 420 near or at the distal end 420d may itself extend through the hole 418 with the distal fastener configured to be fastened to the mitt fastener occurring at the front side 421a (i.e., outside the hole 418).

FIG. 8, by way of example only, is a diagram illustrating an exploded perspective view of the towel 410 and mitt 140 shown in FIGS. 7A and 2A, respectively, while depicting movement of the mitt 140 towards the towel 410 for their removable connection via the mitt fastener 142 and distal fastener 416 through the hole 418.

With reference to FIGS. 7A-8, embodiments are yet further directed to a yet further towel and mitt combination 400 which comprises a towel 410 comprising a tab 420. The tab 420 comprises a hole 418, a distal fastener 416, a proximal end 420c, a distal end 420d, a front side 421a, and a rear side 421b that is opposite to the front side 421a. The hole 418 extends from the front side 421a to the rear side 421b and is positioned towards the proximal end 420c, and the distal fastener 416 is positioned towards the distal end 420d. The towel and mitt combination 400 also comprises a mitt 140 comprising a mitt fastener 142. The distal fastener 416 is configured to be releasably secured to the mitt fastener 142 through the hole 418. The mitt 140 is configured to be operatively and removably connected to the tab 420 via the mitt fastener 142 and the distal fastener 416, and the tab 420 is configured to be formed into a loop, when the distal fastener 416 is releasably secured to the mitt fastener 142 through the hole 418. The loop is configured to be removably connected to an object. In an embodiment, the distal fastener 416 is positioned on the rear side 421b of the tab 420.

In an embodiment, at least a portion of either the distal fastener 416 or the mitt fastener 142 may be configured to be positioned within the hole 418, when the distal fastener 416 is releasably secured to the mitt fastener 142 through the hole 418.

Although embodiments are illustrated in the drawings of a towel and mitt having particular shapes and dimensions, the towel and mitt described in any of the above embodiments may alternatively comprise other shapes and/or dimensions, and may be of any size. Such alternatives are considered to be within the spirit and scope of the present invention, and may therefore utilize the advantages of the configurations and embodiments described above.

Features in any of the embodiments described in this disclosure may be employed in combination with features in other embodiments described herein, such combinations are considered to be within the spirit and scope of the present invention.

The contemplated modifications and variations specifically mentioned in this disclosure are considered to be within the spirit and scope of the present invention.

More generally, even though the present disclosure and exemplary embodiments are described above with reference to the examples according to the accompanying drawings, it is to be understood that they are not restricted thereto. Rather, it is apparent to those skilled in the art that the disclosed embodiments can be modified in many ways without departing from the scope of the disclosure herein. Moreover, the terms and descriptions used herein are set forth by way of illustration only and are not meant as limitations. Those skilled in the art will recognize that many variations are possible within the spirit and scope of the disclosure as defined in the following claims, and their equivalents, in which all terms are to be understood in their broadest possible sense unless otherwise indicated.

The invention claimed is:

1. A towel and mitt combination comprising:
    a towel comprising a tab, the tab comprising a front fastener; and
    a mitt comprising a mitt fastener, wherein the mitt fastener is configured to be releasably secured to the front fastener;
    wherein the mitt is configured to be operatively and removably connected to the towel via the mitt fastener and the front fastener, when the mitt fastener is releasably secured to the front fastener;
    wherein the front fastener is spaced from an edge of the towel, or the mitt fastener is spaced from left and right edges of the mitt; and
    wherein the tab further comprises proximal and distal fasteners and is configured to be formed into a loop when the distal fastener is releasably secured to the proximal fastener, and wherein the loop is configured to be removably connected to an object.

2. The towel and mitt combination of claim 1, wherein the front fastener is spaced from the edge of the towel.

3. The towel and mitt combination of claim 1, wherein the mitt fastener is spaced from the left and right edges of the mitt.

4. The towel and mitt combination of claim 1, wherein the object is selected from the group consisting of an appliance, drawer, chair, cabinet, and combinations thereof.

5. The towel and mitt combination of claim 1, wherein the proximal and distal fasteners are positioned on a rear side of the tab.

6. The towel and mitt combination of claim 5, wherein the front fastener is positioned on a front side of the tab that is opposite to the rear side of the tab.

7. The towel and mitt combination of claim 1, wherein at least one of the front and mitt fasteners is selected from the group consisting of a snap, button, clasp, clip, carabiner, buckle, D-ring, magnetic fastener, hook, hook and loop fastener, and combinations thereof.

8. A towel and mitt combination comprising:
    a towel comprising a tab, wherein the tab comprises a front fastener; and
    a mitt comprising a mitt fastener, wherein the mitt fastener is configured to be releasably secured to the front fastener;
    wherein the mitt is configured to be operatively and removably connected to the tab via the mitt fastener and the front fastener, when the mitt fastener is releasably secured to the front fastener; and
    wherein the tab further comprises proximal and distal fasteners and is configured to be formed into a loop when the distal fastener is releasably secured to the proximal fastener, and wherein the loop is configured to be removably connected to an object.

9. The towel and mitt combination of claim 8, wherein the object is selected from the group consisting of an appliance, drawer, chair, cabinet, and combinations thereof.

10. The towel and mitt combination of claim 8, wherein the proximal and distal fasteners are positioned on a rear side of the tab.

11. The towel and mitt combination of claim 10, wherein the front fastener is positioned on a front side of the tab that is opposite to the rear side of the tab.

12. A towel and mitt combination comprising:
    a towel comprising a tab, wherein the tab comprises a proximal fastener; and
    a mitt comprising a mitt fastener, wherein the mitt fastener is configured to be releasably secured to the proximal fastener;
    wherein the mitt is configured to be operatively and removably connected to the tab via the mitt fastener and the proximal fastener, when the mitt fastener is releasably secured to the proximal fastener; and
    wherein the tab further comprises a distal fastener and is configured to be formed into a loop when the distal fastener is releasably secured to the proximal fastener and when the mitt fastener is not secured to the proximal fastener, and wherein the loop is configured to be removably connected to an object when the mitt is not connected to the tab via the proximal fastener.

13. The towel and mitt combination of claim 12, wherein the tab is configured to be removably connected to an object when the mitt is not connected to the tab via the proximal fastener.

14. The towel and mitt combination of claim 12, wherein the proximal and distal fasteners are positioned on a rear side of the tab.

15. A towel and mitt combination comprising:
    a towel comprising a tab, wherein the tab comprises a hole, a distal fastener, a proximal end, a distal end, a front side, and a rear side that is opposite to the front side, and wherein the hole extends from the front side to the rear side and is positioned towards the proximal end, and the distal fastener is positioned towards the distal end;
    a mitt comprising a mitt fastener, wherein the distal fastener is configured to be releasably secured to the mitt fastener through the hole;
    wherein the mitt is configured to be operatively and removably connected to the tab via the mitt fastener and the distal fastener, and the tab is configured to be formed into a loop, when the distal fastener is releasably secured to the mitt fastener through the hole, and wherein the loop is configured to be removably connected to an object.

16. The towel and mitt combination of claim 15, wherein the distal fastener is positioned on the rear side of the tab.

17. The towel and mitt combination of claim 15, wherein at least a portion of either the distal fastener or the mitt fastener is configured to be positioned within the hole, when the distal fastener is releasably secured to the mitt fastener through the hole.

* * * * *